United States Patent [19]
Jorgensen

[11] Patent Number: 6,007,784
[45] Date of Patent: Dec. 28, 1999

[54] ELECTRIC DISCHARGE SURFACE TREATING ELECTRODE AND SYSTEM

[75] Inventor: Morten Jorgensen, Slinger, Wis.

[73] Assignee: 3DT, Inc., Germantown, Wis.

[21] Appl. No.: 08/893,798

[22] Filed: Jul. 11, 1997

[51] Int. Cl.[6] ............................ B01J 19/08
[52] U.S. Cl. ............................ 422/186.05
[58] Field of Search ............................ 422/186.05

[56] References Cited

U.S. PATENT DOCUMENTS

| | | | |
|---|---|---|---|
| 3,662,169 | 5/1972 | Sörensen et al. | 250/49.5 TC |
| 3,708,733 | 1/1973 | Bille | 317/262 A |
| 3,760,153 | 9/1973 | Davies et al. | 219/384 |
| 3,772,173 | 11/1973 | Matsumoto et al. | 204/165 |
| 3,973,132 | 8/1976 | Prinz et al. | 250/531 |
| 4,051,044 | 9/1977 | Sörensen | 250/531 |
| 4,527,969 | 7/1985 | Prinz et al. | 425/174.8 E |
| 5,443,703 | 8/1995 | Blitshteyn | 204/165 |

OTHER PUBLICATIONS

"The Theory and Practice of Corona Treatment for Improving Adhesion," by R.H. Cramm and D.V. Bibee, Tappi, vol. 65, No. 8, pp. 75–78, Aug., 1982.

Primary Examiner—Daniel J. Jenkins
Attorney, Agent, or Firm—Foley & Lardner

[57] ABSTRACT

A corona discharge treatment apparatus or system and method for treating both insulating and conductive surfaces including a ground member and a plurality of flat electrodes aligned flat side in a row and each electrode having at least one finger-like protrusion with a pointed tip having a radius in the range of about 0.010 to about 0.125 and operating in a high kilo frequency range of about 20k Hz to 30k Hz. The electrodes are individually rotatably mounted to move to and away from the ground member so that the row length of the electrodes can be adjusted to be the same dimension as the width of material to be treated or to only treat selected portions of the material.

25 Claims, 9 Drawing Sheets

ELECTRIC DISCHARGE SURFACE TREATING ELECTRODE AND SYSTEM

FIELD OF THE INVENTION

The present invention relates to electric discharge and, more particularly, to an electrode and system for surface treating with an electric discharge.

BACKGROUND OF THE INVENTION

Electric discharge can develop when atmospheric air is exposed to high voltage potentials between two electrodes. When this occurs, an avalanche effect is created, which is caused by the voltage (consisting of electrically loaded molecules) colliding with neutral molecules and changing them to be electrically loaded. This heavily electrically loaded zone creates ozone and nitrogen oxides from the atmosphere. When an isolator, either insulating or conductive, is placed between the two electrodes, the avalanche effect is avoided and the result is a cloud of ionized air. This ionized air or corona discharge can be used for surface treatment of a number of insulating and conductive materials which show poor or no adhesion properties to other materials, such as printing inks, adhesives, and other insulating and conductive materials. The configuration of the electrode which is to be used for surface treatment can be a line source, such as a wire or roller, or an area source, such as a shoe, a plate or a rectangular-shaped ceramic, or a point source, such as a needle. A point source offers advantages over the line and area source, but its design is critical to achieve the optimum corona discharge without effecting the frequency of the generator.

SUMMARY OF THE PRESENT INVENTION

Accordingly, it is a primary object of the present invention to design a corona discharge system and method with a point source electrode which does not substantially effect the frequency of the generator during operation and provides optimum corona discharge.

Another object of the present invention is provide a corona discharge system and method with a point source electrode design which operates a high frequency and permits high throughput of the material being treated.

A further object of the present invention is provide a point source electrode design which is easy to manufacture and can be configured for materials of different dimensions.

A still further object of the present invention is provide a point source electrode design which permits corona discharge treatment of selected portions of a material to be treated.

An additional object of the present invention is provide a corona discharge system and method with a point source electrode design which reduces the amount of ozone generated during operation.

These and other objects of the present invention are achieved with corona discharge system and method comprising a corona discharge treatment station with plurality of flat rotatable electrodes with at least one protrusion at the outer periphery of each electrode, said protrusion having an pointed end or tip with a radius being in the range of about 0.010 to about 0.125, a ground electrode spaced from the plurality of electrodes, a generator connected to a power source and a transformer connected to the generator and the discharge treatment station whereby a voltage is applied across a space between the plurality of electrodes and the ground to generated a corona discharge during operation. Preferably, each of the electrodes are mounted to be able to rotate the at least one protrusion with its pointed tip toward and away from the ground electrode. The circular flat electrode may comprise more than one protrusion and may include as many as ten, each with its tip spaced equally distance from the ground electrode relative to the tips of the other protrusions. Preferably, to provide a more uniform corona treatment the finger-like protrusion of electrodes with more than one protrusion are slightly offset relative to its body. An assembly of electrodes can contain a mixture of electrodes with a different number of finger-like protrusions. The generator of corona discharge system of the present invention preferably operates at high kilo frequencies in the range of about 20k Hz to about 30k Hz with the optimum frequency being about 25k Hz, which, without effecting the pointed tips of the electrode protrusions, reduces the watt density or power required during operation.

BRIEF DESCRIPTION OF THE DRAWINGS

The foregoing and other objects, aspects and advantages will be better understood from the following detailed description of a preferred embodiments of the invention with reference in the drawings, in which.

DETAILED DESCRIPTION OF THE PREFERRED EMBODIMENTS OF THE INVENTIONS

Figure 1:
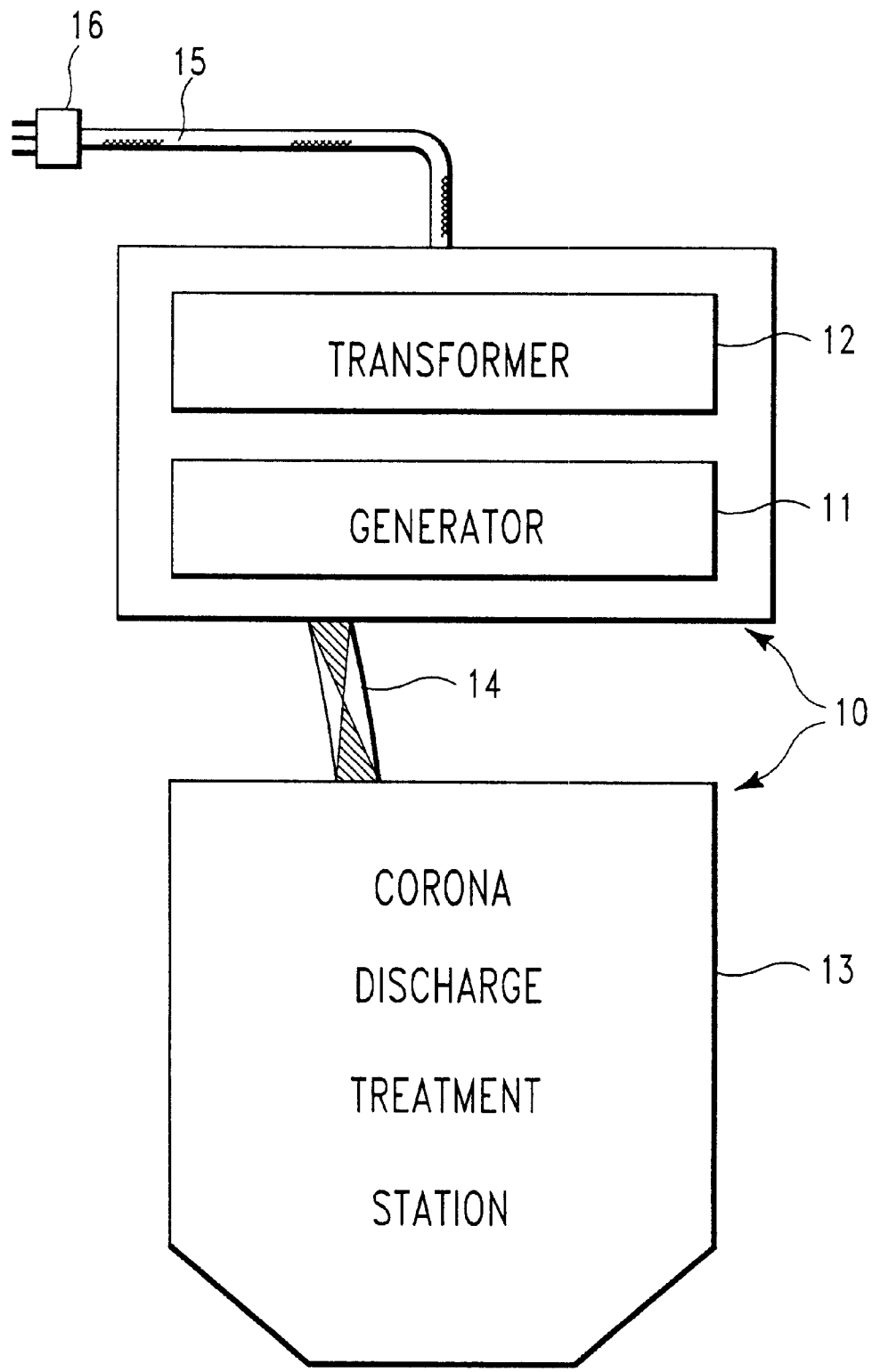
FIG. 1 is block diagram of a generator, a transformer and a treatment station of the present invention.

Before explaining embodiments of the invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

FIG. 1 shows a block diagram of the electric discharge surface treating system 10 which comprises a generator 11 and a transformer 12 contained in the same cabinet shown by the dashed lines and a treatment station 13 containing an electric or corona discharge electrode. Preferably, a high voltage cable 14 shielded for electromagnetic radiation connects the generator 11 and transformer 12 to the electrode (not shown) in the treatment station 13.

The generator 11 preferably is a solid state controlled high frequency generator, with a built-in transformer 12, which can convert input voltages of 100, 120, 200, 220 and 240 volts with a frequency of 50/60 Hz illustrated by a cable 15 and a plug 16 to a high voltage output from 5.6 kV to 15 kV and a higher frequency suitable for electric discharge, or what is commonly known as corona discharge, for surface treatment. Herein, the power output is about 1–10 kW and the power consumption is about 1.2 kVA to 12 kVA.

Figure 1A:
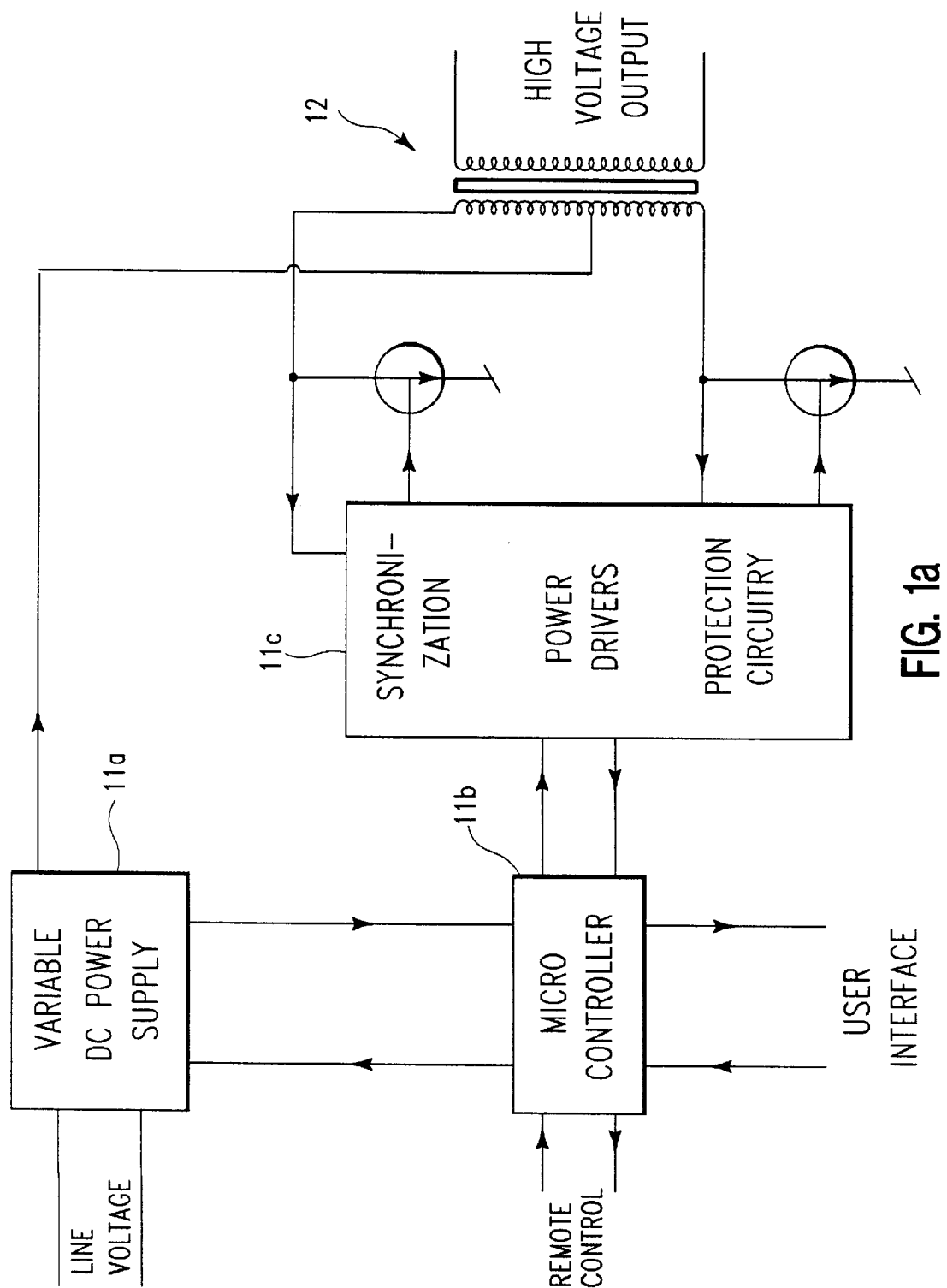
FIG. 1a is a more detailed block diagram of the generator and the transformer of the present invention.

A more detailed block diagram of FIG. 1a shows generator 11 with line voltage connected to a variable DC power supply 11a which is connected to the transformer 12 and both input and output lines of a microcontroller 11b. The microcontroller 11b includes both input and output lines to a remote control (not shown) and an user interface (not shown). The generator 11 also includes synchronization circuitry as shown in the block 11c for automatic frequency matching between the generator, transformer and electrode in a closed loop manner so that the optimal high frequency output arrives at the electrodes (not shown) for corona discharge, thereby making the most efficient use of the generator's power. In addition to the synchronization circuitry, block 11c includes power drivers connected to the microcontroller and protection circuitry because of the high voltage out put of the transformer 12. The operating frequency of electric or corona discharge of the surface treating system is in the high kilo frequency and, preferably, is in the range of about 20k Hz to about 30k Hz and herein the optimum operating frequency is about 25k Hz, which is the most efficient operating frequency for the transformer and the electrode. For overall control purposes, the microcontroller 11b in the generator 11 is programmable and microcode is contained in a memory for establishing the control parameters for the surface treatment.

The transformer 12 is commercially available, but to increase the available line voltage to the voltage level required to generate the corona discharge, the transformer operates with a "dry air operated" coil.

Figure 2:
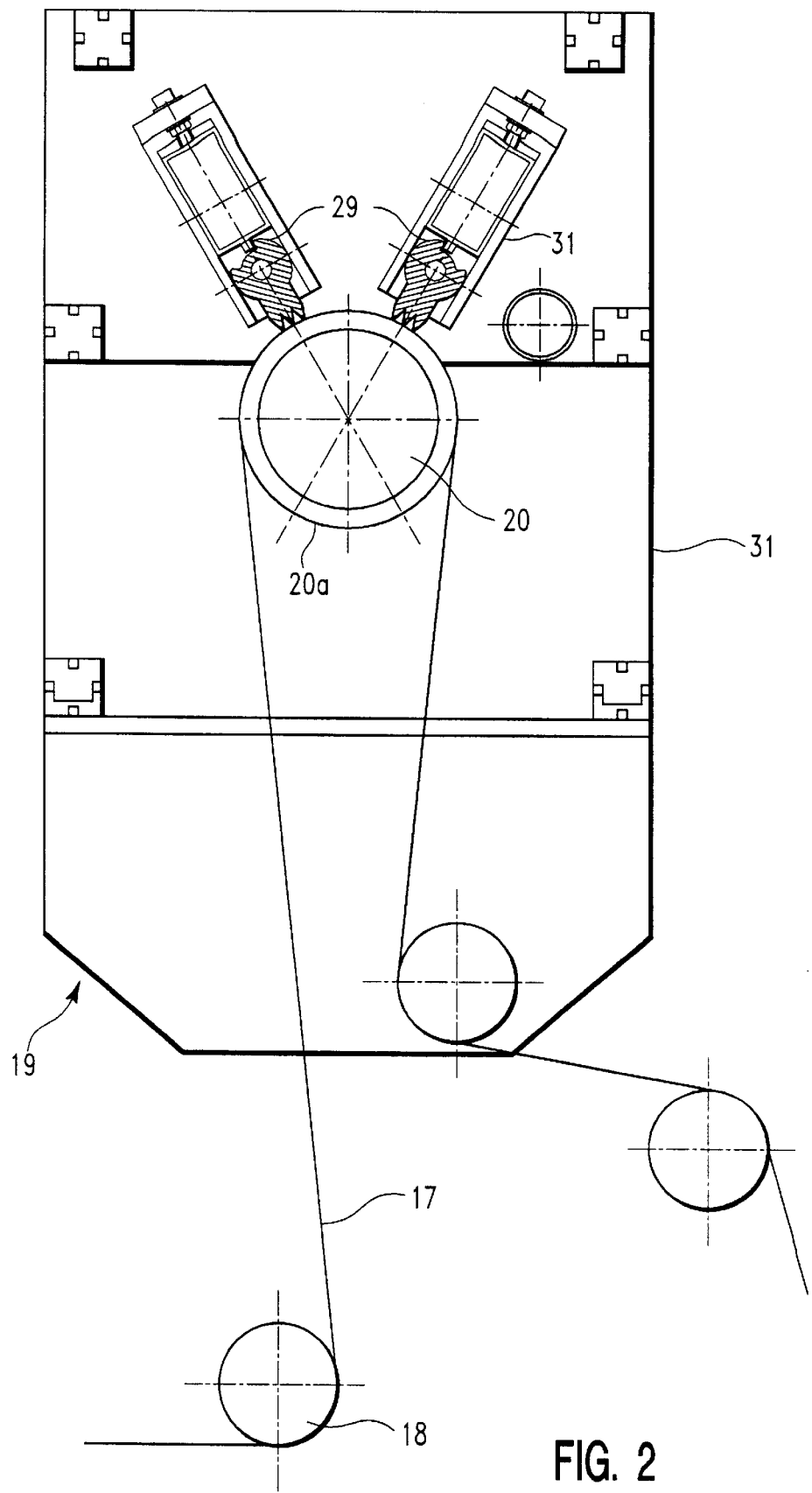
FIG. 2 is an end view of a non-conductive material treatment station of the present invention with the end frame removed and showing an insulating web traveling over a grounded insulated roller being corona discharge treated with two non-insulated coated electrode assembles.

As shown in FIG. 2, an insulating web 17 travels around feed roller 18 into the electric or corona discharge station 19 and around a ground roller 20 with an insulating coating 20a to a tension roller 21 and out of the station to continue on its path around roller 22. The web can be continuous or, alternatively, can consist of one or more sheets. Positioned adjacent the ground roller 20 are herein electrode assemblies 23a and 23b having individual electrodes 24 with the ends 25 of pointed shape or fingers 26 of each electrode 24 spaced from the web 17 of insulating material. Each of the individual electrodes 24 preferably is made of stainless steel to resist corrosion during operation and is formed flat with at least one pointed shape or finger-like protrusion 26, the end 25 of which is adjacent and spaced from the surface of the material to be treated. The pointed shape 26 of the electrode significantly increases the ability of the discharge to release from the electrode as compared to an electrode with a flat end shape of a shoe or plate or with an electrode with a concave shape. The number of fingers or pointed shapes 26 on an electrode can be more than one and as many as ten which are aligned lateral relative to movement between the electrode assembly and the material being treated. If the material is carried on a concave ground substrate, such as the roller 20, the interior finger(s) or pointed shape(s) 27 (FIGS. 6 and 7) on the electrode will be recessed relative to the outer fingers or pointed shapes 28 (FIGS. 6 and 7) so that distance between the ends or tips of the fingers or pointed shapes and the material is the same. Depending of the width of the material to be treated with electric or corona discharge, the electrode structure will comprise an assembly of individual electrodes preferably mounted on a rod 29 to permit rotation, as illustrated by the slot 30, of the electrodes to and away from the material to be treated. The electrodes 24 are separated from each other by conductive or non-conductive spacers, which may either be flat washers or belleville washers to permit the spacers to flex due the heat generated during operation. The ends of each section of the electrode assembly are held in a tight configuration on the rod 29 by expandable fasteners, such as belleville washers (not shown), to allow expansion caused by heating during operation. The rod 29 preferably is a heat conductive metal and also serves a heat sink. By the individual electrodes 24 being rotatable, selective electrodes can be rotated away from the material in those areas of the material where electrical or corona discharge is not desired. The frame 31 of the treatment station 19 is made of a non-corrosive and shielding material and includes a pneumatic driven frame separators (not shown) for easy insertion of material to be treated into the station. High voltage is applied to each of the electrode assemblies 23a and 23b by a shielded high voltage cable (not shown), which enters the frame 31 through the opening 32 and is connected to a metal tube 33 in electrical contact with the electrode assemblies.

Figure 3:
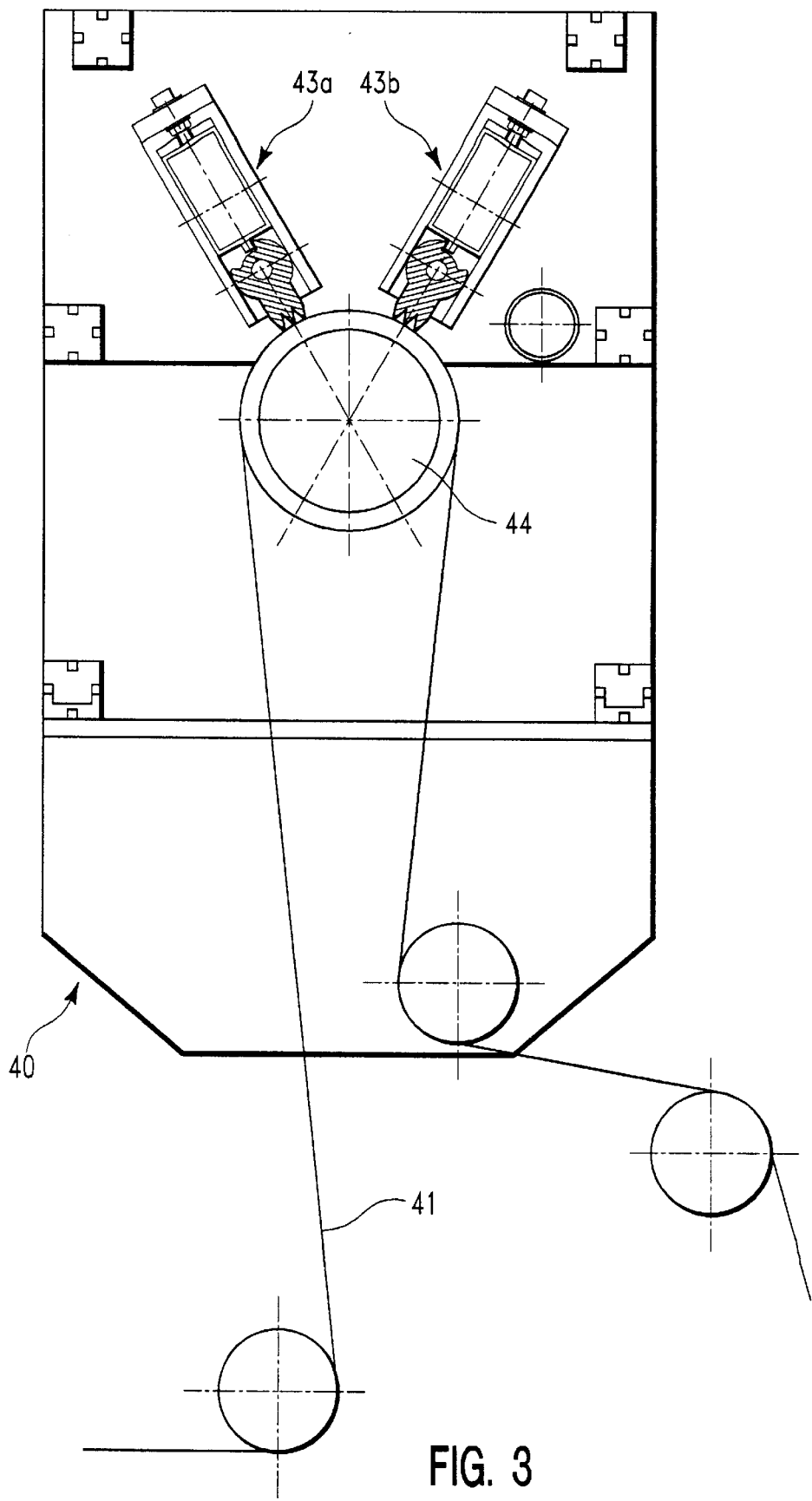
FIG. 3 is an end view of a conductive treatment station of the present invention with the end frame removed and showing a conductive web traveling over a non-insulated ground roller being corona discharge treated with two insulated coated electrode assemblies.

The treatment station 40 in FIG. 3 shows similar structure to the treatment station 19 of FIG. 2 except that is adapted to corona discharge treat a web or sheet 41 of conductive material, such as aluminum, as a single layer or as part of laminated layers. For treatment of conductive materials, the individual electrodes 42 of the electrode assemblies 43a and 43b are coated with an insulating material and the web or sheet 41 of conductive material, travels around a conductive, such as steel or aluminum, ground roller 44. Preferably, the insulating material on the individual electrodes is ceramic and herein is alumina, which is deposited on the metal electrodes by methods and apparatus well known in the art, such as sputtering (both rf and magnetron) and plasma deposition, both being under vacuum. Alternatively, a thermal process, in which ceramic particles in an organic binder are applied to the electrodes and then sintered to fuse the ceramic particles and drive-off the organic binder, and which is also well known in the art, can be used. The specific composition of the ceramic is not critical as long as its dielectric constant is not greater than about 11. Other useful ceramics are corderite, forsterite, porcelain and steatite. Other non-ceramic insulating materials for coating the individual electrodes 42 are silicone and quartz glass. The thickness of the insulator is in the range of 0.040 to 0.125 and the particular thickness will depend on the dielectric constant of the insulating material. These same insulating materials can be used as the insulator on the ground roller 20 of FIG. 2. Except for having a conductive ground roller 44 instead of a insulated ground roller 20 (FIG. 2) and except for having an insulated electrode 42 instead of a non-insulated electrode 24, the treatment stations of FIGS. 2 and 3 are essentially the same. Although FIGS. 2 and 3 show two electrode assemblies on the same side of the material being corona treated, the electrode assemblies can be mounted on both sides of the material for double-side treatment. Up to 12 staggering electrode assemblies per side can be disposed in the path of the material to provide any watt density required for the corona discharge treatment.

Figure 4:
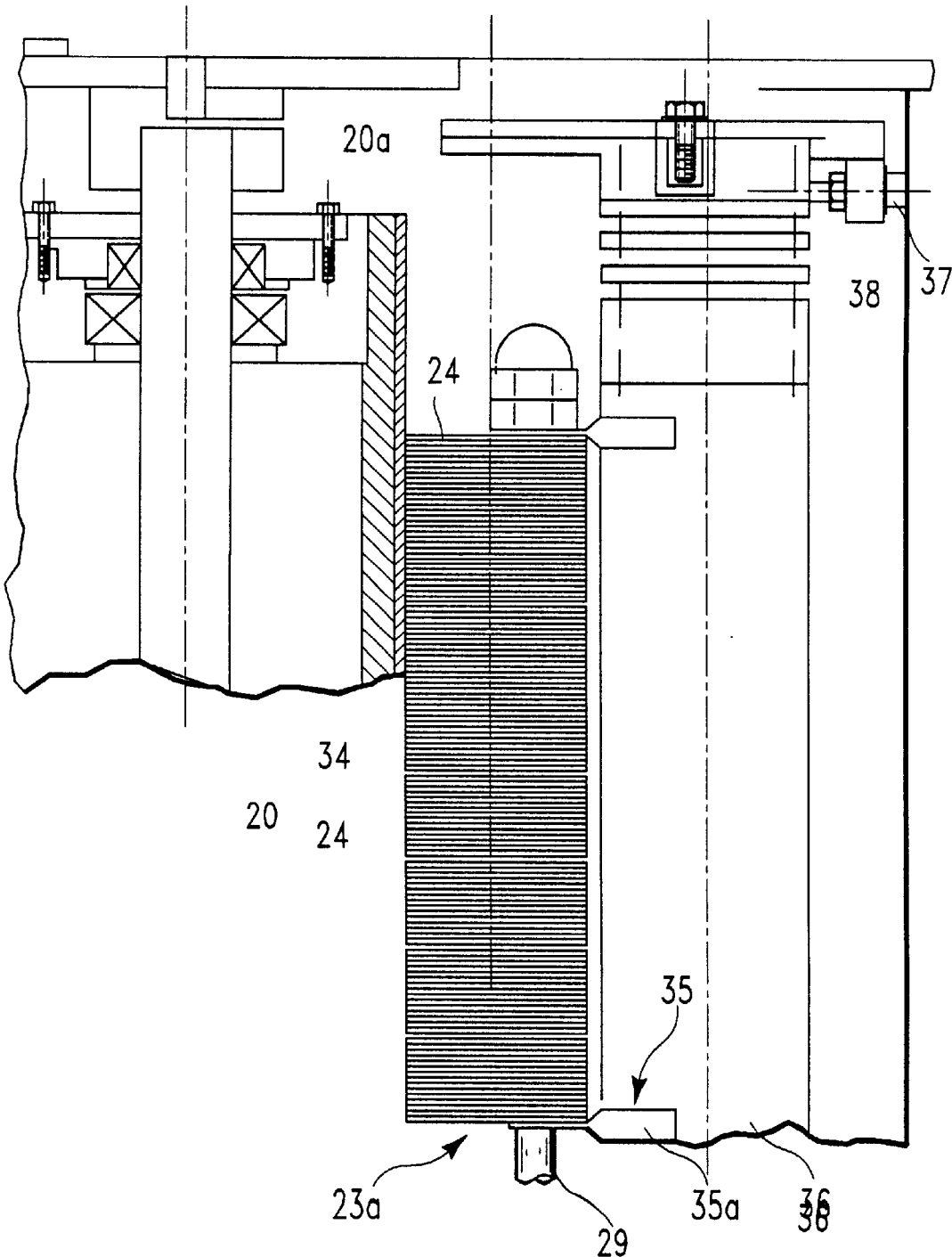
FIG. 4 is an enlarged side view of the electrode assembly of the present invention showing a portion of the individual electrodes mounted for rotation on a rod.

The electrode assembly 23a is shown in a side view of FIG. 4 and the electrodes 24 are illustrated as non-insulated electrodes, but they could be replaced with the insulated electrodes 42 of the electrode assemblies 43a and 43b of FIG. 3.

In FIG. 4, the individual electrodes 24 are aligned flat side in a row and separated by spacers which are not shown but illustrated by the spaces 34 as are expandable fasteners at the end of each section of electrode assembly. The electrode assembly can contain a mixture of electrodes with a different number of finger-like protrusions. one of the reasons for such is mixture of different electrodes is to treat different sections of the material at different corona discharge levels. For example, one section of the surface of the material is treated for printing and another section is treated for applying an adhesive. The rod 29 is mounted on two or more brackets 35 with holes therein and of a size for receiving the rod. Preferably the brackets 35 are twisted 90° and are formed with flat section 35a for attaching to a conductive slidable bar 36 with an insulating end 36a. The bar 36 provides voltage to the electrodes and is capable of moving the electrode assembly 23a toward and away from the ground roller 20 with an insulating coating 20a so as to be able to control the air gap between the finger like protrusion (s) (not shown) of the electrodes and the surface of the insulating coating 20a. Herein, bolt 37 is threaded into the slidable bar 36 for causing movement to and from the ground roller 20 and a nut 38 on the bolt 37 locks the position of the bar 36 after it has been moved to the desired position. Herein, the air gap can be adjusted between 0.020 and 0.250 inches (0.5 and 6.3 mm). A holding disk 20b is part of the ground roller and contains a conductive spring loaded brush (not shown) to ground the roller 20 and to prevent current from flowing to the ground roller bearings 20c. Preferably, the air pressure during operation is about 80 PSI.

Figure 5:
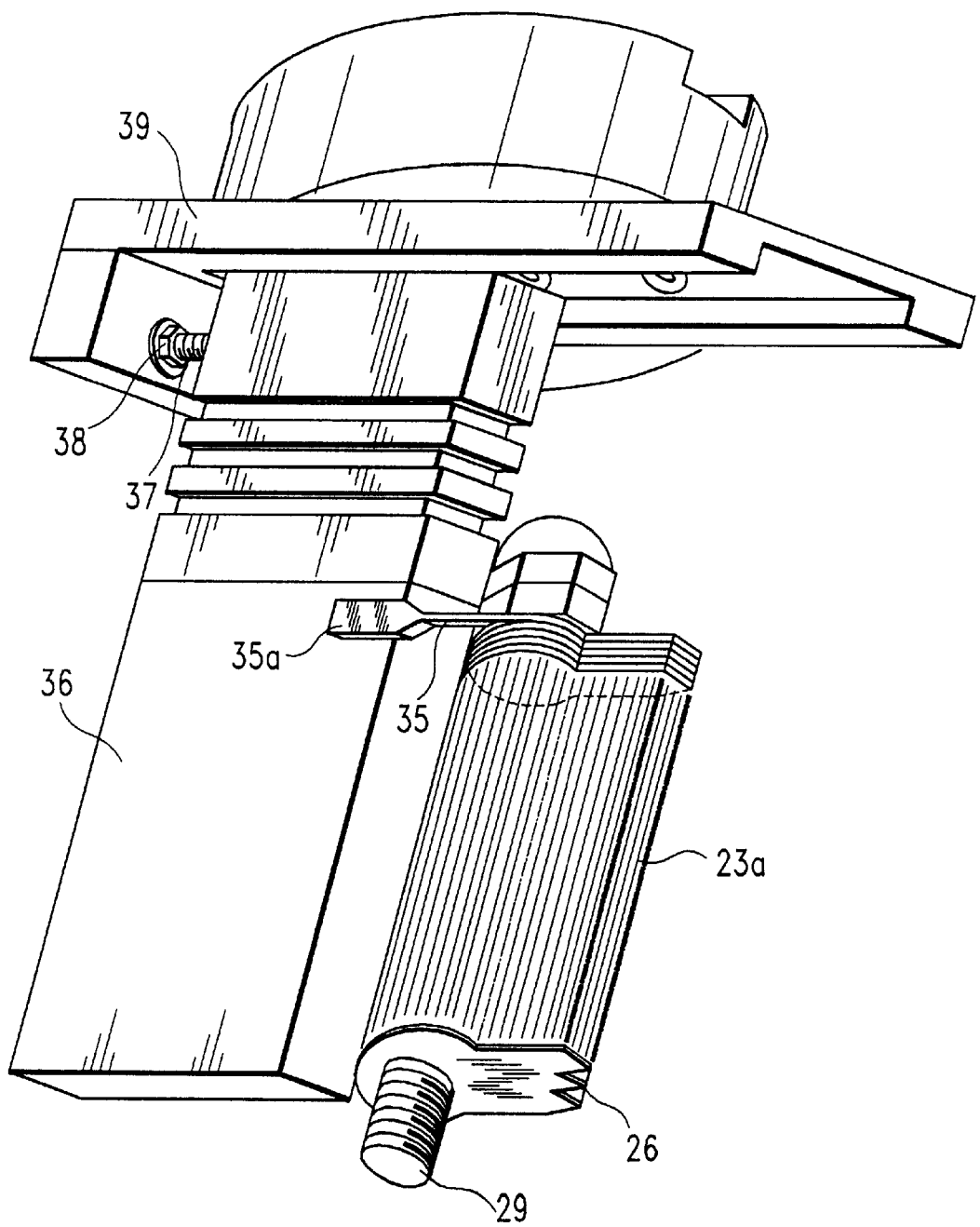
FIG. 5 is an enlarged perspective view of the present invention showing an electrode assembly and a structure on which the assembly is mounted.

As shown in the perspective view of FIG. 5, the insulated end 36a of the slidable bar 36 abuts a rectangular groove plate 39 with the groove of the plate 39 being of a size to receive the insulated end 36a of the bar 36 and permit the end to move freely longitudinally.

Figure 6:
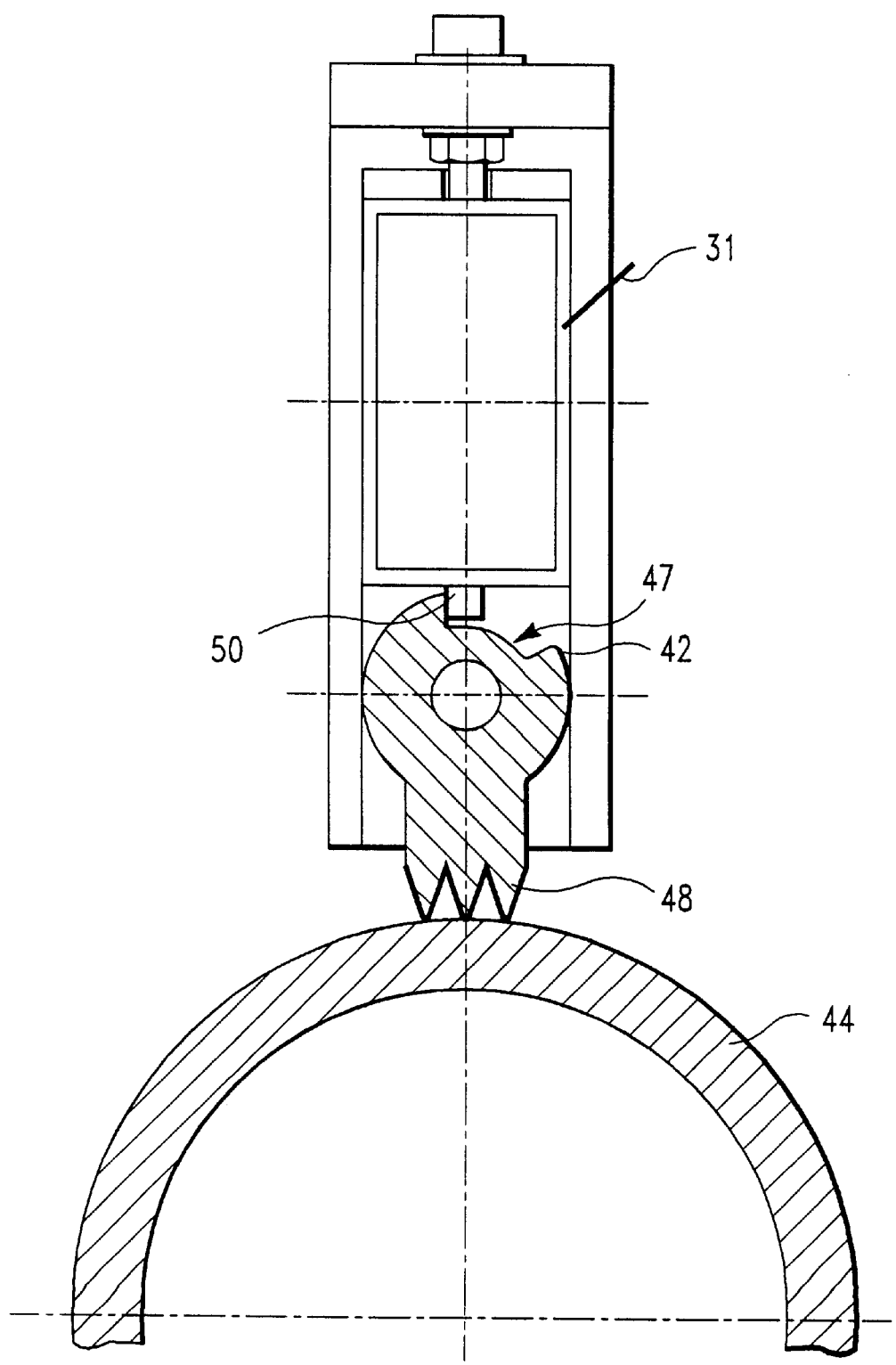
FIG. 6 is an enlarged cross-sectional end view of the present invention showing an insulated electrode with pointed shapes or protrusions positioned adjacent and spaced from a conductive ground roller.
Figure 7:
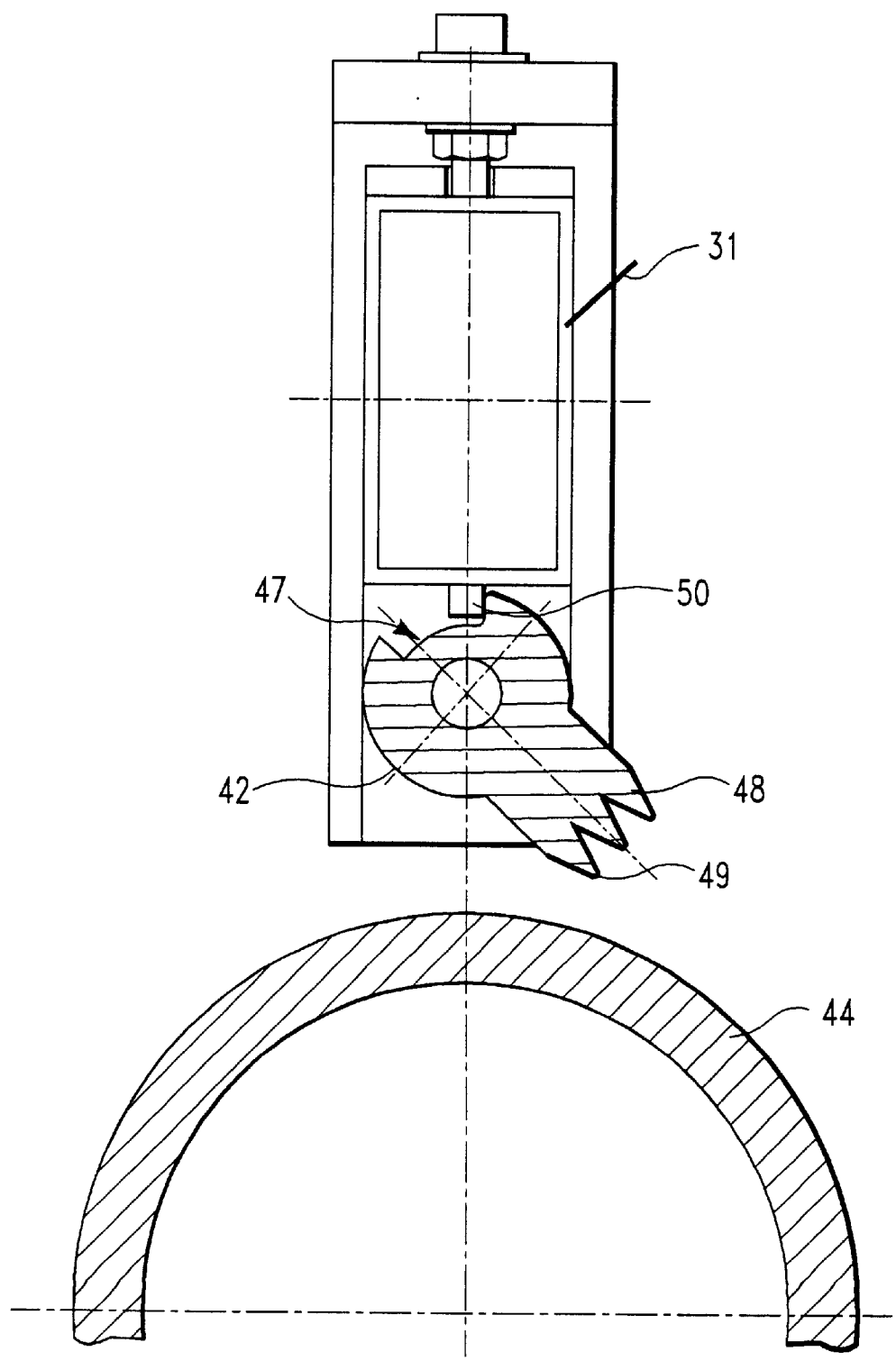
FIG. 7 is an enlarged cross-sectional end view of the present invention showing the insulated electrode with pointed shapes or protrusions of FIG. 6 pivoted away from the conductive ground roller.

FIG. 6 illustrate an insulated electrode 42 in position for corona discharge to a material to be treated (not shown) and spaced from the non-insulated or conductive ground roller 44. The electrode 42 is notched or formed with a curved slot 47 approximately opposite fingers 48 for rotation to and away from the ground electrode 44 as shown in FIG. 7. A stop 50 rides in the slot 47 and controls the limits of rotation of the electrode 42.

Figure 8:
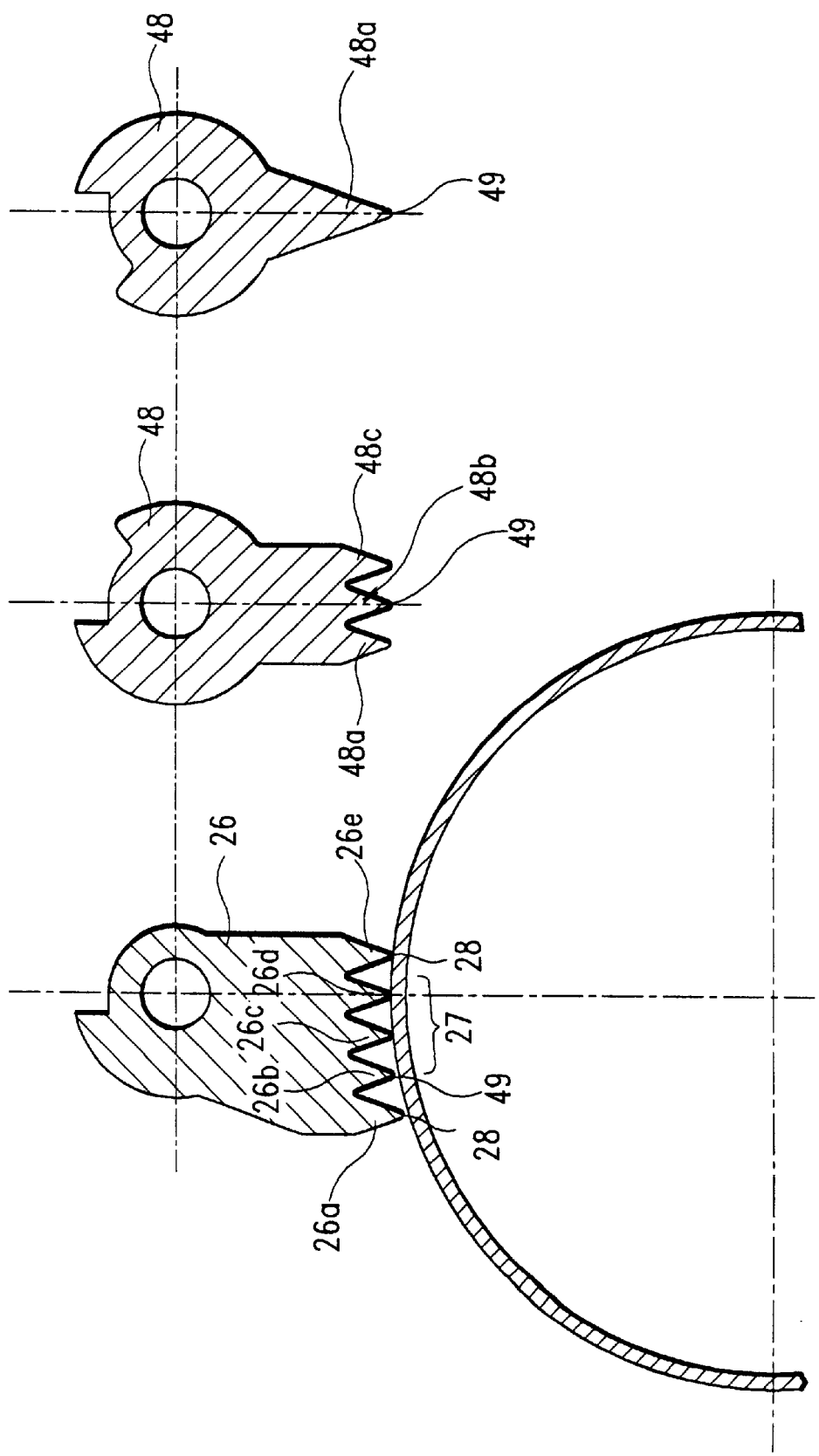
FIG. 8 is an enlarged cross-sectional end view of the present invention showing electrodes with one, three and five pointed shapes, protrusions or fingers.

As examples of different configurations of the individual electrodes 24 and 42, FIG. 8 shows two insulated electrodes 42, one with one pointed shape or finger 48a and the other with three pointed fingers 48a, 48b, and 48c. Also shown in FIG. 8 is an non-insulated electrode 24 with five fingers 26a, 26b, 26c, 26d, and 26e adjacent and spaced from an ground roller coated 20 with an insulating coating 20a. Although not shown, the electrodes also can be configured with two pointed fingers and with four pointed fingers.

The number of finger-like protrusions will vary depending on the material being treated. For example, if the material is thick, such as 0.125 inches, a higher voltage of 15 kV is required. This higher voltage, when applied to electrodes with three or more finger-like protrusions, will cause inference between the discharge of the finger-like protrusion. Thus, with this application, electrodes with one or two protrusions should be used.

With electrodes with more than one finger-like protrusion, the protrusions preferably are offset relative to their flat body to provide a more uniform corona discharge treatment of the surface of material during operation. For example, a three finger electrode will have their protrusions aligned relative to each other but all three will be offset from the flat body from which they extend. The offset relative to the body is in the range of about 0.1 to about 3.0 degrees.

Because the radius of the end or tip 49 of the pointed shape or finger 26 and 48 of the electrode 24 and 42, respectively, affects the frequency of the generator 11, as depicted in FIG. 1, the radius of the tip 49 (FIGS. 6 and 7) is preferred to be in the range of about 0.010 to about 0.125 with the optimized radius being about 0.030. When the radius of the tip 49 is below the lower end of the range, the tip will be too sharp and will become blunted by the heat generated during operation, thereby causing the radius of such a sharp tip to change. Such a change in radius of a plurality of sharp tips will be non-uniform and the radius will differ from tip to tip, which will prevent uniform control of the frequency of the generator. When the radius of the tip 49 of the pointed shape or finger 26 and 48 of the electrode 24 and 42, respectively, is above the upper end of the range, the tip will be too large and will cause the frequency of the generator to be lower than optimum for the corona discharge.

Both the non-conductive and conductive types of treatment stations of FIGS. 2 and 3 can be fabricated with the electrode assemblies 23a and 23b (FIG. 2) or the electrode assemblies 43a and 43b on one or both sides of the material to be treated and with as many as twelve staggered electrode assemblies per side so as to permit any watt density normally required. Due to operating at higher frequencies, such as 25k Hz, and with pointed shaped electrodes 24 (FIG. 2) or 42 (FIG. 3), the volt-ampere (watt) required to maintain a given treatment level is lower. For example, a treatment system operating at 10k Hz will use twice as many watts as one operating at 20k Hz and three times as many watts as one operating at 30k Hz.

As a result of being able to operate at low watt density: (1) the material being treated can be moved at greater speeds past the electrode assembly or, in other words, at higher treatment levels; (2) the amount of ozone generated during operation is reduced; (3) potential damage to the insulating coated on either the electrode or the grounded substrate is decreased; and (4) the cost of electricity is lower.

The electric discharge surface treating system and electrode of the present invention is extremely well suited for use in improving the adhesion of coatings and inks and other applied materials to materials such as paper, polymer and metal surfaces. The system with the electrode can be incorporated into extrusion, laminating, printing and slitter apparatus.

It should be apparent that there has been provided in accordance with the present invention a description that fully satisfies the advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the description.

Having thus described the invention, what is claimed is:

1. Apparatus for the treatment of a surface of a conductive or non-conductive material by subjecting the material to a corona discharge comprising:

at least one set of a plurality of non-cylindrical electrodes each with a flat body and with an outer surface and each having at least one flat non-flexible finger-like protrusion with a pointed tip extending from and integral with the flat body and with an operable electrode position;

a ground member having an outer surface and being equally spaced from each of the pointed tips of the plurality of operable electrodes;

material transporting means for passing material to be treated between the plurality of operable electrodes and the ground member; and means for supplying an electrical potential of a high kilo range frequency to the plurality of operable electrodes to cause a corona discharge on the surface of the material to be treated, said operable electrodes not rotating during the corona discharge.

2. The apparatus of claim 1 wherein the outer surface of each of the plurality of electrodes is conducting, the outer surface of the ground member is insulating, and the surface of the material to be treated is insulating.

3. The apparatus of claim 1 wherein the outer surface of each of the plurality of electrodes is insulating, the outer surface of the ground member is conducting, and the surface of the material to be treated is conductive.

4. The apparatus of claim 1 wherein each of the operable electrodes includes more than one protrusion with a pointed tip and each of the pointed tips are equally spaced from the ground member during corona discharge.

5. The apparatus of claim 4 wherein the number of protrusions range from two to ten.

6. The apparatus of claim 5 wherein each of the protrusions is offset relative to the flat body.

7. The apparatus of claim 1 wherein the set of electrodes contain a mixture of individual electrodes with a different number of protrusions.

8. The apparatus of claim 1 wherein the radius of the pointed tip ranges from about 0.010 to about 0.125.

9. The apparatus of claim 8 wherein the optimum radius of the pointed tip is about 0.030.

10. The apparatus of claim 1 wherein each of the plurality of electrodes are aligned flat side in a row and individually rotatably mounted for moving the pointed tip of the protrusion to and way from spaced relationship with the ground member when the apparatus is not in operation, the electrodes not rotating during corona discharge.

11. The apparatus of claim 10 wherein each of the plurality of flat electrodes are substantially circular in shape with an outer periphery and a hole approximately centrally located, said at least one protrusion with the pointed tip extending from the outer periphery.

12. The apparatus of claim 11 wherein the plurality of electrodes are mounted on a rod positioned parallel to the ground member and a curved slot is notched in the outer periphery of each of the electrodes, approximately opposite the protrusions, to receive a stop for controlling the limits of rotation to and away from spaced relationship with the ground member.

13. The apparatus of claim 12 wherein the rod is a heat conductive material and serves as a heat sink during surface treating operation.

14. The apparatus of claim 3 wherein the insulating surface of each of the plurality of electrodes is a ceramic coating on a metal substrate.

15. The method of treating a surface of a conductive or non-conductive material by subjecting the material to a corona discharge comprising the steps of:

providing at least one set of a plurality of non-cylindrical electrodes, each with a flat body and having at least one flat non-flexible finger-like protrusion with a pointed tip extending from and integral with the flat body and with an operable electrode position, and a ground member being equally spaced from each of the pointed tips of the plurality of operable electrodes, each of the plurality of electrodes and the ground member having an outer surface; and transporting a material with a surface to be treated between the plurality of operable electrodes and the ground member while supplying an electrical potential of a high kilo range frequency to the plurality of operable electrodes to cause a corona discharge on the surface of the material, said electrodes not rotating during the corona discharge.

16. The method of claim 15 wherein the outer surface of each of the plurality of electrodes is conducting, the outer surface of the ground member is insulating, and the surface of the material to be treated is insulating.

17. The method of claim 15 wherein the outer surface of each of the plurality of electrodes is insulating, the outer surface of the ground member is conducting, and the surface of the material to be treated is conductive.

18. The method of claim 15 wherein the number of protrusions of each of the electrodes ranges from two to ten and wherein each of the protrusions is offset relative to the flat body.

19. The method of claim 15 wherein each of the plurality of electrodes are aligned flat side in a row and individually rotatable mounted for moving the pointed tip of the protrusion to and away from spaced relationship with the ground member when the electrodes are not in operation, said electrodes not rotating during the corona discharge.

20. The method of claim 19 wherein the material to be treated is a sheet of material having a width shorter than the row of electrodes and wherein an end portion of the plurality of individual electrodes are rotated away from the ground member so that the remaining operable non-rotated electrodes are equal in dimension to the width of the web of material during corona discharge by non-rotated and non-rotating electrodes.

21. The method of claim 19 wherein the material to be treated is a sheet of material having a width shorter than the row of electrodes and wherein both of the end portions of the plurality of individual electrodes are rotated away from the ground member so that the remaining operable non-rotated electrodes are equal in dimension to the width of the web of material during corona discharge by non-rotated and non-rotating electrodes.

22. The method of claim 19 wherein only selective areas of a material are to be corona discharged treated and wherein selected individual electrodes are not rotated and left in discharge position over the selected areas to be treated and the other electrodes are rotated away from the material so that the selective areas are corona discharged by only the non-rotated and non-rotating electrodes.

23. The method of claim 15 wherein the material to be treated is a sheet of material and the ground member is a roller and wherein the sheet of material is transported around the ground roller and passes under two sets of electrodes positioned longitudinally relative to the transport of the sheet.

24. The method of claim 23 wherein both sets of electrodes are operating in the high kilo range of about 20k Hz to 30k Hz and the sheet of material is corona discharge treated at approximately twice the throughput relative to a single set of electrodes.

25. The method of claim 15 wherein selected areas of the material are to be treated at different corona discharge levels and wherein the plurality of electrodes contain a mixture of individual electrodes differing in number of protrusion so as to provide the different discharge levels.

* * * * *